United States Patent Office 2,844,579
Patented July 22, 1958

2,844,579

PROCESS FOR THIAMINE MONONITRATE

Richard J. Turner, Fanwood, and George J. Schmitt, Bound Brook, N. J., assignors to American Cyanamid Company, New York, N. Y., a corporation of Maine No Drawing. Application August 25, 1955
Serial No. 530,637

8 Claims. (Cl. 260—256.6)

This invention relates to an improved process for isolating thiamine mononitrate in the presence of sulfate ions.

In a convenient method for the preparation of thiamine mononitrate, 3-(2'-methyl-4'-aminopyrimidyl-5')methyl-4-methyl-5-beta-hydroxyethylthiothiazolone(2), otherwise known as Sulbone, is converted to thiamine by oxidation with hydrogen peroxide. The thiamine is obtained in solution as thiamine sulfate, that is, a solution of thiamine in the presence of sulfate ions.

In the past, the desired nitrate salt of the thiamine has been obtained by the method of adding a barium salt such as barium nitrate. This causes the precipitation of the sulfate ion as barium sulfate which is removable by filtration, and also supplies the nitrate ion necessary for the formation of the thiamine mononitrate. However, this precipitation method is time-consuming and difficult to control since no excess of barium may be present and the precipitated barium sulfate is difficult to filter. Furthermore, the use of such a method wherein a heavy metal such as barium is introduced to the reaction mixture causes serious difficulties. Since a material such as thiamine mononitrate is intended for human consumption, it must be of high purity, and free of any contaminants which may have toxic effects. Thiamine mononitrate obtained by the process where a barium salt is used, tends to be contaminated with more than the allowable concentration of barium. Consequently, the materials must be put through expensive and time-consuming purification steps to remove such contaminants.

The present invention is based on the discovery that the thiamine can be precipitated as the nitrate from the sulfate ion-containing solution by the addition of a nitrate salt of a cation which forms a water-soluble sulfate, and adjustment of the pH of the solution. In this way, a pure barium-free and sulfate-free thiamine mononitrate of very good quality is isolated, requiring only slight purification, if any. This process thus overcomes the disadvantages of the former method where the sulfate ion was removed by a process involving the use of a barium salt, resulting in contamination of the product.

In the process of this invention it is not necessary to remove the sulfate ions. The thiamine mononitrate is precipitated in their presence. This is most surprising since a pure nitrate salt is precipitated from a solution high in sulfate ion concentration, often up to about 0.9–1.0 molar in sulfate. The recovery of product is almost quantitative, which is also most unexpected.

The oxidation of Sulbone to thiamine by hydrogen peroxide is carried out in an aqueous medium at temperatures between 10 and 70° using from 3 to 20 parts of peroxide solution per part of Sulbone. This oxidation results in conversion of the thiol sulfur atom to sulfate. Sulfurous acid is added to destroy any unreacted hydrogen peroxide. The solution from the oxidation step, therefore, contains at least an equivalent amount of sulfate ion from the oxidation, plus whatever sulfate results from the reaction of sulfurous acid with excess peroxide.

In the practice of our invention, for the isolation of the thiamine mononitrate in the presence of sulfate ions, the solution from the oxidation reaction is usually concentrated to a convenient volume, by distillation in vacuum at as low a temperature as possible, at least below 70° C. The solution is concentrated so that it contains from about one part of thiamine sulfate to from about 2.5 to 8 parts of solution. At least one equivalent of a water-soluble nitrate is then added, the nitrate being chosen from those salts, the cation of which forms a water-soluble sulfate. The pH of the solution is then adjusted to about 3.9 to 7.5 by the addition of a water-soluble carbonate or bicarbonate and the desired mononitrate precipitates and is removed by filtration.

Various soluble nitrate salts may be used. It is necessary that both the nitrate and the sulfate of the cation used be soluble in the concentrated solution from which the thiamine nitrate is precipitated. As a rough rule of thumb, a solubility of more than 10% in cold water is necessary for both the nitrate and sulfate of the cation used. Common cations with this property include ammonium and substituted ammonium, the alkali metals (lithium, sodium, potassium, rubidium, and caesium), such divalent cations as chromous, cobaltous, ferrous, manganous, and zinc and such other cations as aluminum, manganic and nickel. In general, the question of possible toxic contaminants must be considered, and for this reason, as well as cost and availability, it is greatly preferred to use either ammonium or the alkali metals, especially ammonium, which permits the use of higher concentrations because of the high solubility of its sulfate.

An alternative procedure which is effectively equivalent to that described is to add nitric acid to the concentrated solution of thiamine sulfate. The use of an extra amount of e. g., ammonium carbonate in the adjustment of the pH will achieve the same end result, although it will add to the expense. The hydrogen ion must therefore also be considered as one of the cations whose nitrate can be added, even though the pH adjustment neutralizes the hydrogen ion so that the sulfate which remains in the filtrate is that of another cation.

Another alternative in the procedure is that the concentration required for isolation of the product may be carried out either before or after the addition of the nitrate. In general, however, it is preferred to concentrate before adding the nitrate.

Although good quality product results, when the mononitrate salt is precipitated out anywhere in the pH 4.5–7.5, we prefer a range of about 5.3–6 for the most satisfactory results. The thiamine mononitrate which precipitates is removed by filtration which may be carried out over a wide temperature range from —5° C. up to about 70° C. Lower temperatures are preferred, however, for best recoveries. Losses due to solubility are naturally less at the lower temperatures and we, therefore, prefer to isolate from a solution at a temperature of not more than about 25° C.

To achieve the desired pH common alkaline reagents may be used. Preferred examples of these are ammonium and alkali metal hydroxides, carbonates or bicarbonates. These agents may be added as a solid material or in the form of a solution. Other alkaline reagents can equally well be used but care must be taken to use cations which fall within the group described above, lest the sulfate precipitate out and contaminate the product.

*Example 1*

To 5.9 parts of a 5% hydrogen peroxide solution, made slightly acid (pH 2–4) with nitric acid, is slowly added one part of Sulbone 3-(2'-methyl-4'-aminopyrimidyl - 5') - methyl - 4 - methyl - 5 - beta - hydroxylethylthiothiazolone(2). The temperature is maintained at 20–25° C. by cooling until the oxidation is complete. Excess peroxide is destroyed by the addition of sulfurous acid to a starch-iodide endpoint. The solution is clarified using a filter aid, an activated carbon, and fuller's earth. The clarified solution at this point amounts to about 10.5 parts. This is concentrated under reduced pressure to a volume of about 3.4 parts. Then, to the concentrated solution is added 0.32 part of ammonium nitrate with stirring. The pH of the solution is then adjusted to 5.3–5.8 by adding a saturated solution of ammonium carbonate. The pH adjustment is carried out at a temperature of 40–45° C. The mixture is cooled to about 5° C. and the solid is removed by filtration. The solid cake is washed with 0.2 part of anhydrous alcohol in portions. An excellent yield of high quality thiamine mononitrate is obtained.

Example 2

The process of Example 1 is followed except that equivalent amount of sodium nitrate is used in place of the ammonium nitrate. Good thiamine nitrate is obtained. Similar results are obtained by the use of magnesium, zinc, or aluminum nitrates.

Example 3

The procedure in Example 1 is followed except that the pH of the solution before filtration of the product is adjusted by the addition of solid ammonium carbonate. Again a good yield of good thiamine nitrate is obtained.

Example 4

The procedure of Example 1 is followed except that the pH of the solution, before filtration of the product, is adjusted to 7.5 by the addition of solid ammonium carbonate. Again good thiamine nitrate is obtained.

Example 5

The procedure of Example 1 is followed except that the pH of the solution before filtration of the product is adjusted to 3.9 by the addition of solid ammonium carbonate. Similar results are obtained.

Example 6

The procedure of Example 1 is followed except that the filtration of the product is carried out at room temperature instead of 5 to 10° C. A good thiamine nitrate is obtained.

Example 7

The procedure of Example 1 is followed except that an equivalent amount of sodium nitrate is used instead of the ammonium nitrate. An equivalent amount of sodium bicarbonate is used in place of the ammonium carbonate, and the filtration of the product is carried out at a temperature of 40–45° C. Good thiamine nitrate is obtained. Similar results are obtained when lithium or potassium nitrate are used in place of the sodium nitrate.

Example 8

The procedure of Example 7 is followed except that the filtration of the product is carried out at a temperature of 35° C. The yield of thiamine nitrate is slightly reduced but the quality of the product is good.

Example 9

The procedure of Example 1 is followed except that an equivalent quantity of nitric acid is used in place of ammonium nitrate. It takes a larger quantity of ammonium carbonate solution to adjust the pH. The product is in every way equivalent.

We claim:
1. A process for the isolation of thiamine mononitrate from aqueous solutions of thiamine sulfate which comprises adding at least a substantially stoichiometric amount of a water-soluble nitrate of a cation whose nitrate and sulfate are both soluble to at least the extent of 10% in cold water and precipitating the thiamine mononitrate by the addition of sufficient alkaline reagent to produce a pH of 4.5 to 7.5, the alkaline reagent being selected from the group consisting of the hydroxides, carbonates, and bicarbonates of cations whose nitrates and sulfates are both soluble to at least the extent of 10% in cold water.

2. A process for the isolation of thiamine mononitrate from aqueous solutions of thiamine sulfate which comprises adding to a solution of one part of thiamine sulfate in from 2.5 to 8 parts of water at least a substantially stoichiometric amount of a water-soluble nitrate of a cation whose nitrates and sulfates are both soluble to at least the extent of 10% in cold water and precipitating the thiamine mononitrate by the addition of sufficient alkaline reagent to produce a pH of 4.5 to 7.5, the alkaline reagent being selected from the group consisting of the hydroxides, carbonates, and bicarbonates of cations whose nitrates and sulfates are both soluble to at least the extent of 10% in cold water.

3. A process for the isolation of thiamine mononitrate from aqueous solutions of thiamine sulfate which comprises adding at least a substantially stoichiometric amount of a water-soluble nitrate of a cation whose nitrate and sulfate are both soluble to at least the extent of 10% in cold water concentrating the solution until it contains at least 0.12 part of product per part of solution and precipitating the thiamine mononitrate by the addition of sufficient alkaline reagent to produce a pH of 4.5 to 7.5, the alkaline reagent being selected from the group consisting of the hydroxides, carbonates, and bicarbonates of cations whose nitrate and sulfate are both soluble to at least the extent of 10% in cold water.

4. The process of claim 2 in which the water-soluble nitrate is ammonium nitrate.

5. The process of claim 4 in which the thiamine mononitrate is precipitated at a pH of 5.3 to 6.0.

6. The process of claim 5 in which the precipitated product is filtered from the reaction mixture at a temperature below 70° C.

7. The process of claim 6 in which the filtration is carried out at a temperature below 25° C.

8. The process of claim 7 in which the alkaline reagent is ammonium carbonate.

References Cited in the file of this patent
FOREIGN PATENTS 5,429    Japan _____ Oct. 21, 1953